United States Patent
Schmidt et al.

(10) Patent No.: US 6,408,170 B1
(45) Date of Patent: Jun. 18, 2002

(54) CONTROL CIRCUIT FOR A MICROCONTROLLER

(75) Inventors: Thomas Schmidt, Woldsolms; Karl-Heinz Knobl, Limburg, both of (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/165,685

(22) Filed: Oct. 2, 1998

(30) Foreign Application Priority Data

Oct. 8, 1997 (DE) .......................................... 197 44 375

(51) Int. Cl.[7] .............................................. H05K 11/00
(52) U.S. Cl. .......................... 455/344; 713/323; 701/36
(58) Field of Search .............................. 701/36, 29, 33; 700/31, 82, 79; 340/825.31, 425.5, 568, 687, 426; 455/345, 344, 343, 456; 307/10.1; 702/186; 714/55; 713/323–324

(56) References Cited

U.S. PATENT DOCUMENTS

| | | | | |
|---|---|---|---|---|
| 4,945,335 A | * | 7/1990 | Kimura et al. ............... 340/426 |
| 5,203,000 A | | 4/1993 | Folkes et al. ................ 395/750 |
| 5,398,332 A | * | 3/1995 | Komoda et al. .............. 714/55 |
| 5,554,966 A | * | 9/1996 | Iijima et al. ................. 340/687 |
| 5,563,799 A | * | 10/1996 | Brehmer et al. ............. 702/186 |
| 5,621,250 A | * | 4/1997 | Kim ........................... 307/10.1 |
| 5,696,979 A | * | 12/1997 | Saitou ......................... 713/323 |
| 5,794,164 A | * | 8/1998 | Beckert et al. .............. 455/456 |
| 5,850,514 A | * | 10/1998 | Gonda et al. ................ 714/55 |
| 5,870,018 A | * | 2/1999 | Person et al. ................ 340/426 |
| 5,903,737 A | * | 5/1999 | Han ............................ 395/280 |
| 5,950,709 A | * | 9/1999 | Krueger et al. ............. 165/11.1 |
| 6,047,380 A | * | 4/2000 | Nolan et al. ................. 713/324 |

* cited by examiner

Primary Examiner—Curtis Kuntz
Assistant Examiner—Barry W Taylor
(74) Attorney, Agent, or Firm—John Vodopia

(57) ABSTRACT

A description is given of a control circuit situated outside a microcontroller, which control circuit serves to control, support and monitor the microcontroller. This is achieved in that function signals are supplied to the control circuit (2), with which function signals presettable function modes of a device (12, 13, 14) are associated, which device is controlled by said microcontroller (1), in that the control circuit (2) supplies a read-request signal to the microcontroller (1) when the function signals change, which read-request signal induces the microcontroller (1) to evaluate the changed external signal and/or read the data associated with said signal, and in that the control circuit (2), in case the microcontroller (1) is in an inactive state when the function signals change, supplies a reset signal to this microcontroller prior to supplying the read-request signal, which reset signal brings the microcontroller (1) into an active state, and after supplying the reset signal, the control circuit activates the watchdog circuit.

12 Claims, 1 Drawing Sheet

CONTROL CIRCUIT FOR A MICROCONTROLLER

DESCRIPTION

Figure 1:
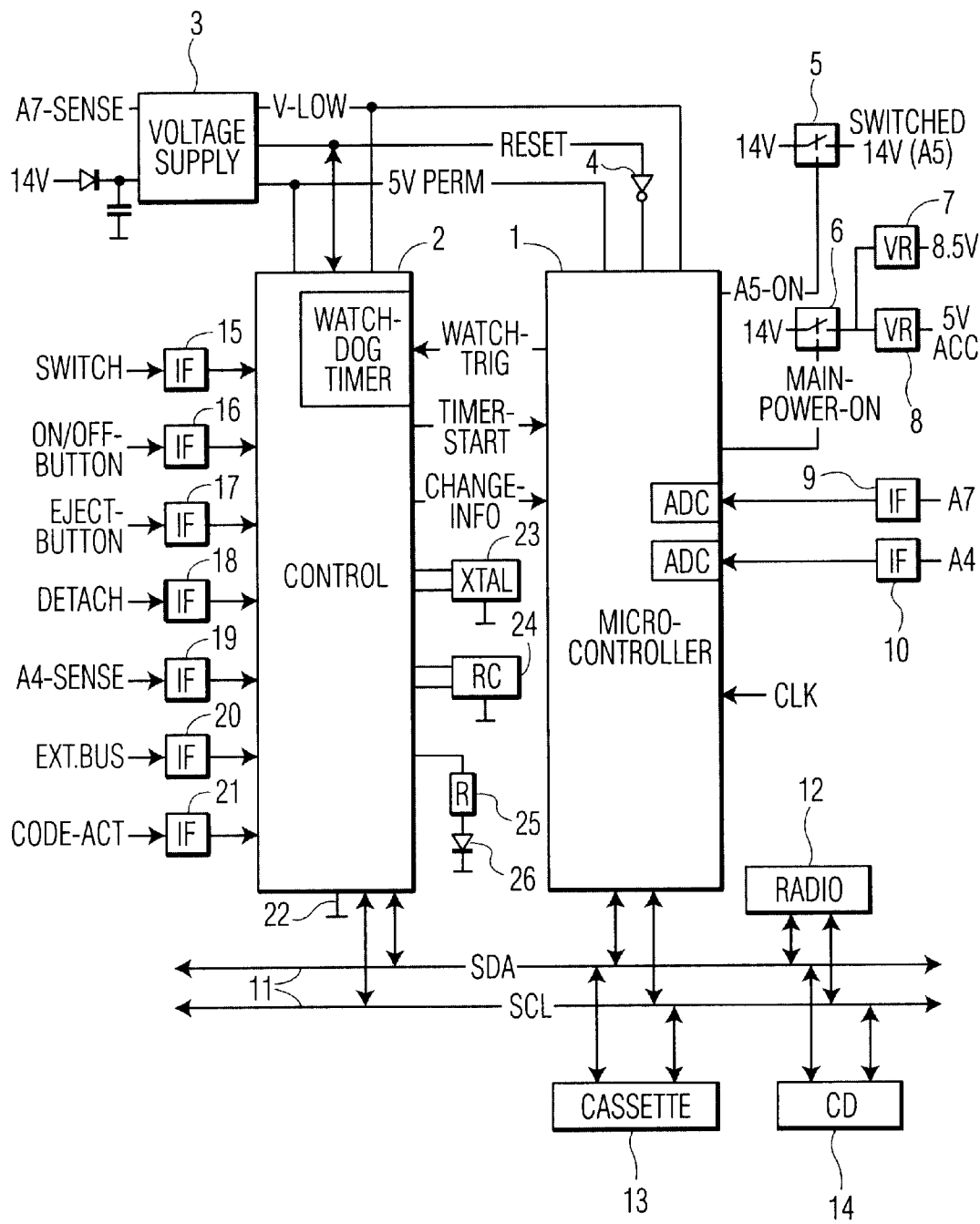

The invention relates to a control circuit for controlling, supporting and monitoring a microcontroller, which control circuit is built up outside the microcontroller, which is resettable by means of the control circuit, and which control circuit includes a watchdog circuit.

Such a control circuit is disclosed in U.S. Pat. No. 5,203,000. Said control circuit and the microcontroller are separately built up on an integrated circuit. The control circuit carries out a kind of power management, particularly when the power supply voltage is on the way up or on the way down. In addition, the height of the power supply voltage is monitored. The control circuit is capable of resetting the microcontroller which is triggered manually through a control button. The control circuit further includes a watchdog circuit.

It is an object of the invention to further develop such a control circuit so that it can off-load the microcontroller from even more functions, and, in addition, the microcontroller can be operated in the inactive mode as often as possible, so as to save power.

In accordance with the invention, this object is achieved in that function signals are supplied to the control circuit, with which function signals presettable function modes of a device are associated, which device is controlled by said microcontroller, in that the control circuit supplies a read-request signal to the microcontroller when the function signals change, which read-request signal induces the microcontroller to evaluate the changed external signal and/or read the data associated with said signal, and in that the control circuit, in case the microcontroller is in an inactive state when the function signals change, supplies a reset signal to this microcontroller prior to supplying the read-request signal, which reset signal brings the microcontroller into an active state, and after supplying the reset signal, the control circuit activates the watchdog circuit.

The function signals supplied to the control circuit are linked to specific functions of the device which is controlled by the microcontroller. Consequently, if one of said functions is triggered, then the associated function signal undergoes a change. This is recognized by the control circuit and a read-request signal is supplied to the microcontroller by said control circuit, and, as a result, the microcontroller must read data assigned by the control circuit. These data may relate, for example, only to the signalling of the fact that a specific function signal has been triggered, however, it is also possible that associated data are transmitted. In this manner, the microcontroller is off-loaded from the continuous monitoring of the state of the function signals. In principle, any desired number of signals may be monitored by the control circuit. Only if one of the function signals changes, a corresponding signal is supplied to the microcontroller which must react to this. Consequently, the microcontroller does not have to continuously monitor the function signals, but becomes active only when one of the signals changes. As a result, computing time is saved or, also when the function signals are to be monitored, the microcontroller may be in the inactive mode.

Dependent upon the application and the device controlled by the microcontroller, said microcontroller does not have to be active continuously; on the contrary, it can be in an inactive state which may consist in that the microcontroller is in a kind of power-saving mode at a reduced clock frequency or that the power supply is completely switched off. The microcontroller can stay in this inactive state as long as none of the function signals changes. If, following a change of one of the function signals, the microcontroller must perform a corresponding function, said microcontroller is first converted to the active state by the control circuit. After said conversion by means of a reset signal, the control circuit supplies the above-explained read-request signal to the microcontroller. Subsequently, the proper functioning of the microcontroller is monitored by means of the watchdog circuit.

In this manner, it is achieved that the microcontroller can optionally stay in the inactive state when none of the function signals changes. As a result, a saving of energy is achieved.

Consequently, the functioning of the control circuit is governed by the fact whether the microcontroller is in the active or inactive state when one of the function signals changes, that is when the microcontroller is in the active state, the control circuit supplies only the read-request signal, and when the microcontroller is in the inactive state, the control circuit first supplies a reset signal and subsequently the read-request signal to the microcontroller.

In an advantageous embodiment of the invention in accordance with claim 2, the control circuit is used to activate the microcontroller of a car radio when specific functions of the car radio are triggered. Particularly for this application, it may be advantageous to put the microcontroller into the inactive, power-saving mode as long as none of the function signals changes. If, however, for example the operating part of the car radio is provided, then the microcontroller has to be activated, which is done through the control circuit. Also for monitoring traffic messages, time-controlled recordings of the traffic messages, or the like, the control circuit can be advantageously used.

The measures in accordance with the further embodiment as claimed in claim 3 ensure that after a reset signal has been given, such a signal is not repeated within a predetermined time period so as to first enable the microcontroller to start up.

It is possible that errors occur in the control circuit. For this purpose, in accordance with a further embodiment as claimed in claim 5, an internal monitoring of the clock signal of the control circuit is carried out. If this clock signal drops out, a corresponding error message is supplied to the microcontroller, thus reporting to the microcontroller that the control circuit does not function error free and that, as a result, its signals cannot be evaluated. In this case, it is possible that the microcontroller itself must monitor the function signals. As a result of this measure, it is precluded that a control circuit disturbance leads to a disturbance of the entire system, in particular of the function of the microcontroller.

A further embodiment of the invention as claimed in claim 6, can advantageously be used for time-controlled monitoring. By comparing the two values, for example, traffic announcements can be recorded in a time-controlled manner without it being necessary that the microcontroller is active in the period of time between recordings or that the microcontroller performs a time-monitoring function.

The measure in accordance with the embodiment of the invention as claimed in claim 7 can also be used to optically signal errors in the control circuit. Further, the intermittent signal in car radios during the inactive state of the microcontroller can be used as an external signal for theft protection.

By means of the measures as claimed in claim 8, theft protection can be achieved in that the control circuit records the variation in reference voltage and the duration of the outage of the reference voltage, or that the control circuit records the instant when the device is no longer at the reference voltage. This is then reported to the microcontroller, which can react in an appropriate manner, for example by blocking the functions of the device.

To monitor the height of the supply voltage of the device, use can advantageously be made of the measures claimed in claim 9 of the invention. Also in this case, the microcontroller is not responsible for the time-monitoring function.

To save energy, the control circuit may optionally be used, as claimed in claim 10, to switch off the power supply voltage of the microcontroller during the inactive phase. In this case, the supply voltage must be switched on again before delivery of the reset signal. By virtue thereof, a further saving in energy is achieved.

These and other aspects of the invention will be apparent from and elucidated with reference to the embodiment described hereinafter.

In the drawing:

The FIGURE shows a block diagram of a microcontroller 1 and and inventive control circuit 2 including a number of peripheral circuit elements.

The circuit shown in the FIGURE in the form of a block diagram may be used, for example, in a car radio to control the functions of said radio.

The control circuit 2 serves to control, support and monitor the microcontroller 1.

A supply-voltage circuit 3 is provided to which a permanent plus signal of 14 V is supplied as well as a signal, referenced A7-SENSE in the FIGURE, which latter signal is also a permanent plus signal of the vehicle in which the car radio is provided. The supply-voltage circuit 3 monitors these signals and generates from these signals a 5 V signal for the microcontroller 1 and the control circuit 2, which 5 V signal is referred to as 5 V PERM in the FIGURE. After a voltage-supply outage, the circuit 3 also generates a reset signal which is supplied to the control circuit 2. The circuit 3 further generates a signal, referred to as V-LOW in the FIGURE, which notifies the microcontroller about a voltage drop (for example below 8 V) of the supply voltage (+14 V), thus enabling the microcontroller to put the control circuit in the mode by which the microcontroller can be triggered. The microcontroller can now be put into the power-saving mode, so that the entire system (in this case a car radio) can cope with voltage drop several seconds without overrun. The V-LOW signal is also supplied to the control circuit so that, if necessary, the evaluation can take place through the control circuit and the entire system, after the voltage drop (if this has not led to a reset of the control circuit) can be put into the same function state as before the voltage drop by a reset of the microcontroller.

The reset signal is further supplied to the microcontroller 1 in an inverted form by means of an inverter 4, so that after an outage of the supply voltage, the microcontroller can be put in a defined initial state again.

A signal A5-ON is supplied by the microcontroller 1, which signal can switch on/off by means of a circuit 5 a voltage of +14 V for the device, referred to in the FIGURE as SWITCHED 14 V (A5).

Further, voltage regulators 7 and 8 are provided which supply voltages of, respectively, 8.5 V and 5 V. The microcontroller controls a switch 6 via the signal MAIN-POWER-ON.

Further, two interface circuits 9 and 10 are provided to which the permanent plus signal A7 or a switched signal A4, corresponding to the ignition voltage of a vehicle, are supplied. The analog/digital converters in the microcontroller evaluate the voltages. These signals enable the microcontroller 1 to monitor the height of these voltages. The microcontroller 1 is further coupled to an I²C-bus control circuit 11 via control connections. Via such I²C-bus connections, control tasks within the car radio are taken over. The FIGURE symbolically represents a radio part 12, a cassette deck 13 and a CD exchanger 14, the functions of which can be controlled by means of the I²C-bus control circuit 11. Said I²C-bus control circuit 11 itself is controlled by means of the microcontroller 1. The I²C-bus control circuit 11 is also coupled to the control circuit 2. This coupling takes place via SDA and SCL signals which contain, respectively, the data content and a clock signal.

The control circuit 2 is coupled, via interface circuits 15 through 21, to external signals whose state or change is monitored continuously by said control circuit.

For example, the interface circuit 15 is connected to a desired switch of the car radio. If this switch is operated, the interface circuit 15, after changing the SWITCH signal, supplies an appropriate signal to the control circuit 2.

Correspondingly, the operation of the on/off switch of the car radio is signalled via the interface circuit 16, the operation of the ejection switch of the tape drive of the car radio is signalled via the interface circuit 17, the removal or fitting of an operating element of the car radio is signalled via the interface circuit 18, the monitoring of the ignition voltage of the vehicle is signalled via the interface circuit 19, signals from an external bus, for example from a CD exchanger, are signalled via the interface circuit 20, and the activation of a car-radio theft protection code is signalled via the interface circuit 21.

Thus, if via one of the interface circuits 15 through 21 a change in or occurrence of the associated function signal to be monitored is signalled, the control circuit 2 supplies a CHANGE-INFO signal to the microcontroller 1. In this manner, said microcontroller is notified that one of the function signals has changed, which one of these signals has changed, and that the microcontroller may have to request data from the control circuit 2. As a result, the microcontroller 1 is off-loaded from the continuous monitoring of the function signals.

It is possible that the microcontroller 1 is in an inactive state in which, for example, the clock signal of the microcontroller 1 is reduced as regards its frequency.

If the microcontroller 1 is in an inactive state when one of the function signals supplied by the interface circuits 15 through 21 occurs or changes, then this is recognized by the control circuit and first a reset signal is supplied to the microcontroller 1, causing said microcontroller to be put into the active state. Subsequently, the microcontroller is informed via the CHANGE-INFO signal, which represents the read-request signal, about which signal has changed and a corresponding read-request is made to the microcontroller 1.

As a result, the microcontroller 1 may remain in an inactive state as long as none of the function signals changes. Only in the case of a change, the microcontroller 1 is activated and must react to the function signal. Said function signal is triggered and controlled by means of the control circuit 2.

The control circuit 2 is connected to a reference voltage via a connection 22. Further, a RC oscillator 24 is provided, or the quartz oscillator may be connected. The control circuit may alternatively be operated with a quartz oscillator or a RC oscillator (both are integrated). The control circuit 2 is further coupled to a quartz oscillator 23 to generate an internal clock signal.

Apart from the above-described central function of monitoring the function signals, the control circuit 2 may also be used for other applications.

For example, the control circuit 2 is coupled via a resistor 25 to a light-emitting diode (LED) 26. Via this diode, for example, when the car radio is switched off, an intermittent signal can be given which serves as a theft protection. In addition, the frequency of this intermittent signal can be changed in case of a fault in the control circuit 2.

The control circuit 2 can internally monitor its clock signal and in case of an error of the clock signal, as a result of which an error-free functioning of the control circuit 2 is no longer ensured, a corresponding signal, not indicated in the FIGURE, can be given to the microcontroller 1 by said control circuit.

The FIGURE further shows a TIMER-START signal which is delivered by the control circuit 2 to the microcontroller 1 to monitor processes which are recurrent with respect to time. Via this signal, for example, a regular monitoring of the height of the voltages of the signals A7 and A4 by the microcontroller can be triggered. Via this signal, the control circuit is put into the power-saving mode for a fixed period of time (in this case, for example, 250 ms), during which period of time, the register contents are preserved, however, during this period of time the control circuit does not react to signals from the inputs 15 through 21. After said period of time, the control circuit generates a reset to actuate the microcontroller. This function serves to put the entire system very rapidly into the power-saving mode (including the microcontroller) for the duration of a drop of the power supply voltage (+14 V) without the necessity of communicating via I²C (SCL, SDA).

The control circuit 2 is further capable of supplying time-controlled signals to the microcontroller 1, for example in the CHANGE-INFO signal. This is carried out by means of a counter in the control circuit 2, whose reading, which is changed as a function of time, is compared with a fixed, preselectable counter reading. If both readings are identical, a corresponding signal is supplied to the microcontroller 1 whose reaction depends upon the type of signal supplied. This can be used, for example, for a time-controlled recording of traffic announcements.

Since the supply voltages or signals for monitoring said supply voltages (A4-SENSE) are supplied to the control circuit 2, said control circuit can also perform a time-controlled monitoring of the supply voltage. It can also be established when and how long the supply voltage connections of the device are high-ohmic after removal of the device from the vehicle. This can be signalled to the microcontroller 1 as a theft signal, which microcontroller 1 can react accordingly. The control circuit 2 further includes a watchdog circuit, not indicated in the FIGURE, which monitors the watchdog signals represented as WATCH-TRIG in the FIGURE. These signals must occur at regular time intervals. If they do not occur at regular intervals, there is a fault in the function of the microcontroller 1.

Summing up it may be said that the control circuit 2 can perform various functions which, as a result, no longer have to be performed by the microcontroller 1 and hence lighten the burden of said microcontroller. The control circuit 2 further enables the microcontroller 1 to be put into an inactive state, also when function signals have to be monitored. If one of said function signals changes, the control circuit 2 reacts, dependent upon whether the microcontroller 1 is in the active state or in the inactive state, by providing, respectively, only the read-request signal CHANGE-INFO or previously also a reset signal.

The control circuit 2 is simultaneously provided with an additional integrated monitoring function which ensures that the read request (CHANGE-INFO) is reacted upon. If the microcontroller 1 does not react within a predetermined period of time coupled to the WATCH-TRIG, then the control circuit 2 assumes that there is a function fault and generates a reset signal.

Of course, the functions which can be performed or monitored by means of the control circuit 2 are not limited to those mentioned in the example in accordance with the FIGURE. Dependent upon the field of application or the type of device controlled by the microcontroller 1, the functions monitored may also be of different types.

What is claimed is:

1. A control circuit for controlling, supporting and monitoring a microcontroller, which control circuit is built up outside the microcontroller, which is resettable by means of the control circuit, and which control circuit includes a watchdog circuit, wherein function signals are supplied to the control circuit from various microprocessor controlled devices with which function signals'presettable function modes of said devices are associated in that the control circuit supplies a read-request signal to the microcontroller when it determines that the function signals change, which read-request signal induces the microcontroller to evaluate the changed function signal and read data associated with said signal, and in that the control circuit, in case the microcontroller is in an inactive state and not responsive during the time when the function signals change, supplies a reset signal to this microcontroller prior to supplying the read-request signal, which reset signal brings the microcontroller into an active state, and after supplying the reset signal to the microprocessor, the control circuit activates the watchdog circuit.

2. A control circuit as claimed in claim 1, wherein the control circuit and the microcontroller are arranged in a car radio which is controlled through the microcontroller, and in that the predefined external functions are functions of the car radio, in particular, an activated switching voltage, a triggered depression of a key on the car radio, a cassette inserted into the car radio or fitting an operating element of the car radio.

3. A control circuit as claimed in claim 1, wherein after a reset signal has been supplied to the microcontroller, at least during a predetermined time period, no further reset signals are supplied to said microcontroller.

4. A control circuit as claimed in claim 1, wherein the watchdog circuit is deactivated after the microcontroller has been transferred to the inactivate state by means of said microcontroller, and in that, after the watchdog circuit has been triggered, it supplies maximally five times a reset signal to the microcontroller when said microcontroller is in the active state.

5. A control circuit as claimed in claim 1, wherein in the control circuit an internal monitoring of an internal clock signal takes place, and in case of a drop-out of the internal clock signal, a corresponding error message is supplied to the microcontroller.

6. A control circuit as claimed in claim 1, wherein the control circuit comprises a time-dependent counter whose starting value can be changed and whose current value is compared to an externally presettable value, and if the counter value and the presettable value correspond to each other, a preselectable function of the microcontroller is triggered.

7. A control circuit as claimed in claim 1, wherein the control circuit comprises an output for an intermittent signal whose blinking interval, in the case of errors in one of: the control circuit and the microcontroller, which are changed in a manner associated with the type of error.

8. A control circuit as claimed in claim 1, wherein the control circuit and the microcontroller are accommodated in a car radio, in that the control circuit comprises a voltage-detection input which, if in the on-state of the car radio is switched to the power supply voltage of the car radio and, in the off-state, to the reference voltage of the car radio, and if in that the control circuit evaluates the voltage-detection input in such a manner that a theft is recognised and reported to the microcontroller when the voltage-detection input is at neither of these two voltages.

9. A control circuit as claimed in claim 1, wherein to detect a decrease of the power supply voltage of the device with respect to the nominal value, the control circuit supplies a timer signal to the microcontroller at intervals which are determined by means of a counter arranged in the control circuit, thus causing the microcontroller to trigger a measurement of the height of the power supply voltage.

10. A control circuit as claimed in claim 1, wherein the power supply voltage of the microcontroller can be switched by means of the control circuit, and in that the microcontroller can be switched to the inactive state by switching off the power supply voltage by means of the control circuit.

11. A method for controlling, supporting and monitoring a microcontroller, the method comprising:

providing a control circuit which includes a watchdog circuit built up outside the microcontroller, said microcontroller resettable by means of the control circuit;

supplying function signals to the control circuit from devices controlled by the microcontroller, with which function signals presettable function modes of said devices are associated;

supplying a read-request signal to the microcontroller by the control unit when the received function signals change, which read-request signal induces the microcontroller to evaluate the changed function signal and read data associated with said read-request signal;

supplying a reset signal to the microcontroller by the control circuit prior to supplying the read-request signal thereto, in case the microcontroller is in an inactive state when the function signals change, the reset signal bringing the microcontroller into an active state; and activating the watchdog circuit after supplying the reset signal to the microcontroller by the control circuit.

12. A system for controlling, supporting and monitoring a microcontroller, the system comprising:

a control circuit means which includes a watchdog circuit means built up outside the microcontroller, said microcontroller resettable by means of the control circuit means;

means for supplying function signals from devices controlled by the microcontroller to the control circuit means, with which function signals presettable function modes of said devices are associated;

means for supplying a read-request signal to the microcontroller by the control circuit means when the function signals change, which read-request signal induces the microcontroller to evaluate the changed function signal and read data associated with said read-request signal;

means for supplying a reset signal to the microcontroller by the control circuit means prior to supplying the read-request signal thereto, in case the microcontroller is in an inactive state when the function signals change, the reset signal bringing the microcontroller into an active state; and means for activating the watchdog circuit means after supplying the reset signal to the microcontroller by the control circuit means.

* * * * *